Sept. 27, 1966 E. C. JOSEPH 3,275,994

DATA PROCESSING SYSTEM

Filed Dec. 30, 1963 5 Sheets-Sheet 1

INVENTOR
EARL C. JOSEPH
BY Thomas J. Nikolai
ATTORNEY

Sept. 27, 1966 E. C. JOSEPH 3,275,994

DATA PROCESSING SYSTEM

Filed Dec. 30, 1963 5 Sheets-Sheet 2

Sept. 27, 1966 E. C. JOSEPH 3,275,994

DATA PROCESSING SYSTEM

Filed Dec. 30, 1963 5 Sheets-Sheet 4

Sept. 27, 1966 E. C. JOSEPH 3,275,994

DATA PROCESSING SYSTEM

Filed Dec. 30, 1963 5 Sheets-Sheet 5

United States Patent Office 3,275,994
Patented Sept. 27, 1966

3,275,994
DATA PROCESSING SYSTEM

Earl C. Joseph, Minneapolis, Minn., assignor to Sperry Rand Corporation, New York, N.Y., a corporation of Delaware Filed Dec. 30, 1963, Ser. No. 334,234
9 Claims. (Cl. 340—172.5)

Figure 1A:
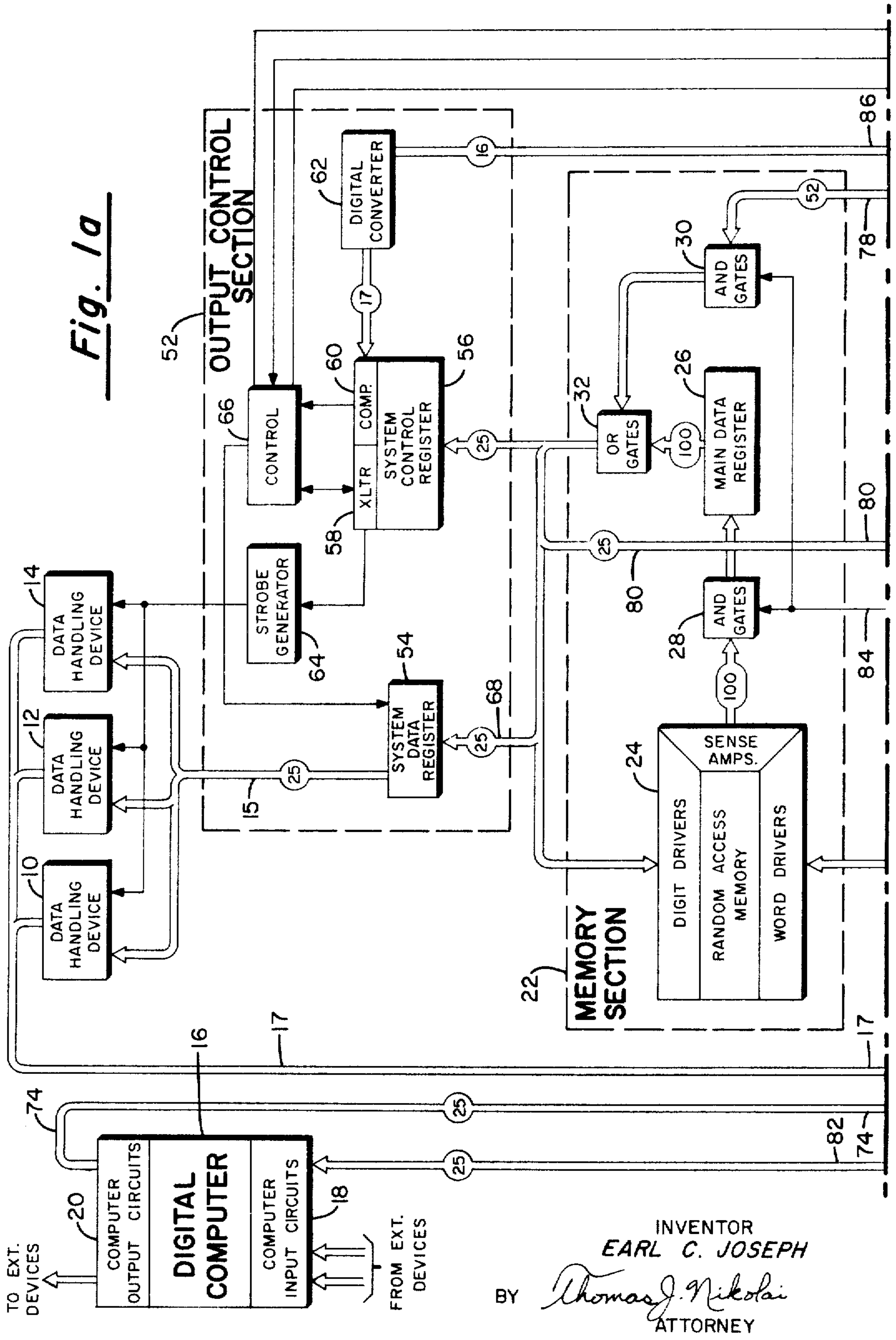

This invention relates generally to digital data processing apparatus and more specifically to a digital controller for use in such a system for controlling the transmission of data between a plurality of data handling devices and a general purpose digital computer.

For some time now, digital computers have found application in solving highly technical scientific problems and in performing tedious bookkeeping tasks and other related business procedures. It has only been relatively recently that computers have found wide application in the solution of real-time control problems. In real-time operations the processing of data takes place in substantial synchronism with a physical process in such a fashion that the results of the data processing are useful in guiding the physical operation taking place. In a typical real-time system, data are provided to the computer from a plurality of sensing devices associated with the process and a computation is made on these data with the results of the computations being used to exert control over the process as it continues. When a computer is used to perform regular scientific calculations or to process business data, time is not as critical a factor as it is in a real-time system, where the computer must "keep up" with changes as the process is carried out. The present invention is concerned with a controller which may be used in conjunction with a digital computer operating in a real-time mode to accommodate the transfer of data between various sensors used in the system and the computer and for timing and directing the transfer of control information developed within the computer to various parts of the system for effecting modifications as the need arises.

As a typical example of an application for a controller of the type described herein, consider a traffic control system wherein a plurality of traffic sensors are distributed throughout a city for measuring traffic flow, and wherein a digital computer is employed to perform calculations based on the information supplied from the sensors and where commands (control signals) based upon the calculations are to be transmitted to devices, such as stop lights, also distributed throughout the city, so as to promote a more even and faster flow of traffic. In this application, time is the critical parameter. That is, commands to the traffic controls distributed throughout the city must be transmitted at predetermined times in order to achieve the desired traffic flow. It should be understood, however, that a controller of the type described herein may also be used in industrial process control work where temperature, pressure or some other variable, other than time, is the parameter that it is desired to control.

While a general purpose digital computer can be employed directly to receive inputs from remote sensors and to provide control outputs to data handling devices, where the number of origins and destinations for data signals is large, it is desirable to provide auxiliary apparatus of the type to be described herein such that the computer is free to perform other functions until the time arrives when the received signals are to be utilized by the computer or when the control signals are to be transmitted to the remote locations. For example, the digital computer may be utilized in interim periods for processing payroll information or the like for the city, but when the time arrives when information relating to the traffic control problem must be processed, the controller of the present invention is switched into a communicating relationship with the computer to perform this function. Hence, by employing a controller of the type described herein the computer may be utilized to its fullest extent.

The controller of the present invention may include a random access memory which is adapted to store at addressable locations therein data and control words sent from a computer or from one or more of a plurality of data handling devices and which, upon initiation, is able to supply data and control words to the computer and to the data handling devices. As the term is used herein, a control word is an arrangement of binary digits (bits) which specifies which one of the devices communicating with the controller is to receive data, and also under what conditions the data is to be transmitted. A data word, on the other hand, is a group of binary signals or bits which may be supplied to the computer as an operand to be used during a calculation, or may be the means employed for directing the remotely located data handling devices to perform a given function, depending upon the permutations of the binary signals in the data word.

Associated with the random access memory are a pair of registers termed the system control register and the system data register, respectively. Both of these registers may be loaded with information from the memory, control words being sent to the system control register and data words being sent to the system data register. When a control word is loaded in the system control register a translator associated therewith operates on selected bits of the control word to uniquely select one of a plurality of destinations for the data word contained in the data register. Associated with the remaining bits of the system control register is a comparator. When the particular bits of the control word applied to a first set of inputs to this comparator become equal to a group of binary signals supplied by a suitable digital converter such as a clock the comparator produces an output signal for causing the information contained in the data register to be transmitted to the selected one of the various possible destinations selected by other bits in the control word.

In a traffic control system, the bits of the system control register associated with the comparator may specify a particular time at which the contents of the system data register are to be transmitted to the particular data handling device or to the computer, as determined by the bits of the system control register associated with the translator. The digital converter may then take the form of a pulse counter which may be driven by a source of regularly occurring clock signals. At the time that the digital count in the counter become equal to the time tag portion of a system control register, the comparator will produce an output signal for gating the data word contained in the system data register to the selected device. Of course, when a parameter other than time is the critical factor to be controlled, the digital converter must produce binary signals representative of the condition under when controlling signals will be sent to the devices to be controlled.

During a transfer of information from the computer to the controller memory, the digital converter is also used to initially append the criterion tag, prior to the storage of the composite word in a predetermined memory address. Hence, the same circuits which provides the inputs to the comparator also supply the control word tag to the data supplied by the remotely located data handling devices or the computer.

It is accordingly an object of the present invention to provide means for initiating control outputs to data handling devices dependent upon predetermined values of a variable and for tagging data inputs thereto with a value of this variable.

Another object of this invention is to provide a digital controller capable of tagging, according to some predetermined criterion such as time, the data received into the device and for performing a comparison based on the criterion for controlling the conditions under which output signals will be transmitted from the device.

Still another object of the present invention is to provide a digital controller for use with a computer for controlling the temporary storing of input and output data and for controlling the transmission of this data to one or more selected utilization devices.

Still another object of the present invention is to provide a digital controller which provides basic control and timing signals for a computer controlled process, and which also serves as a data transfer switch between the computer used therein and various other parts of the entire system.

Yet still another object of the present invention is to provide a digital controller for use with a digital computer, which will operate in a real time-mode for directing the execution of a process.

The foregoing objects and features of novelty which characterize this invention, as well as other objects of the invention are pointed out with particularity in the claims appended hereto and forming a part of the present application. For a better understanding of the invention, its advantages and specific objects attained with its use, reference is directed to the accompanying drawings and descriptive matter in which there is illustrated and described a preferred embodiment of the invention.

Figure 1B:
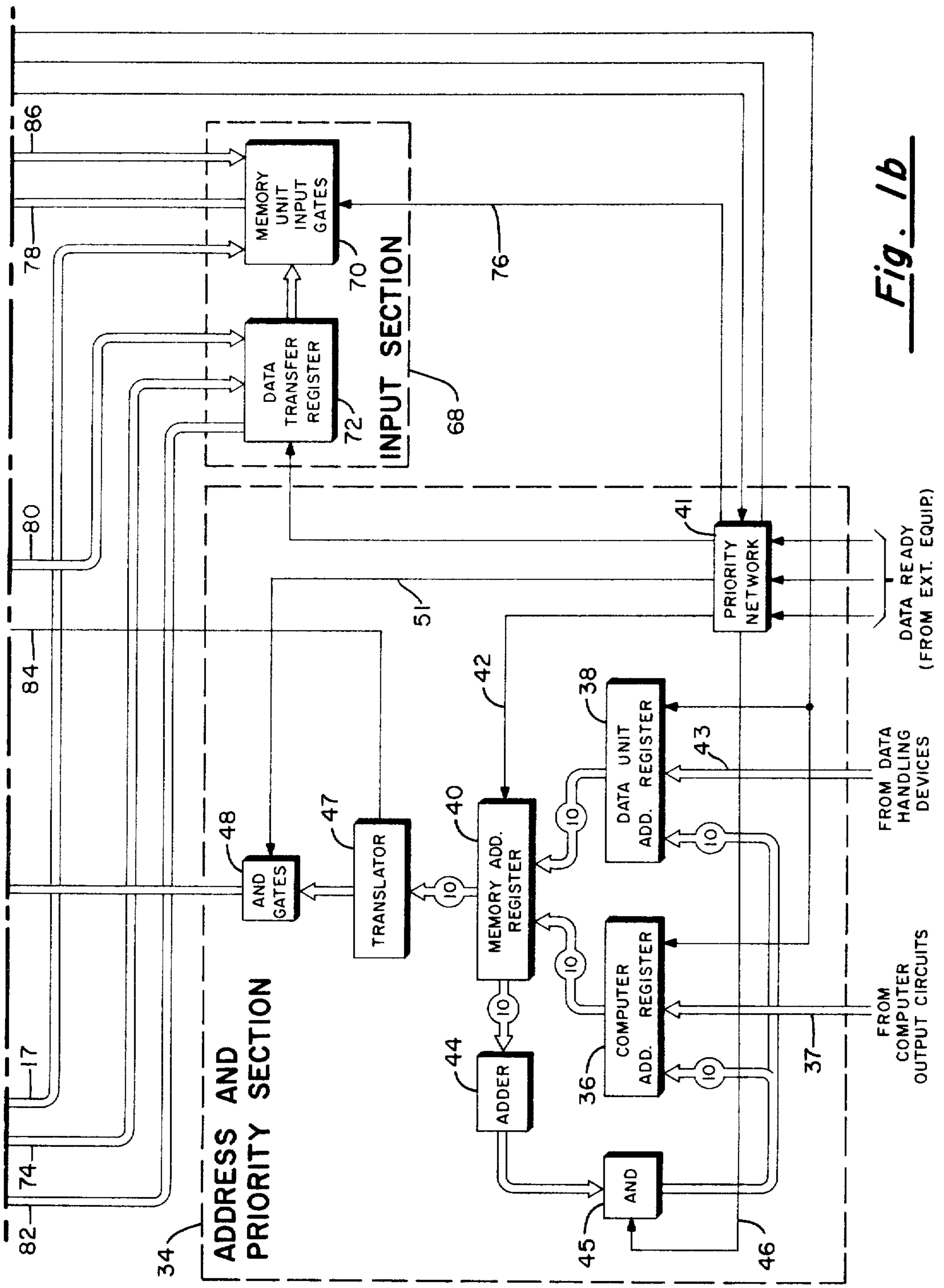
Figures 2, 3A:
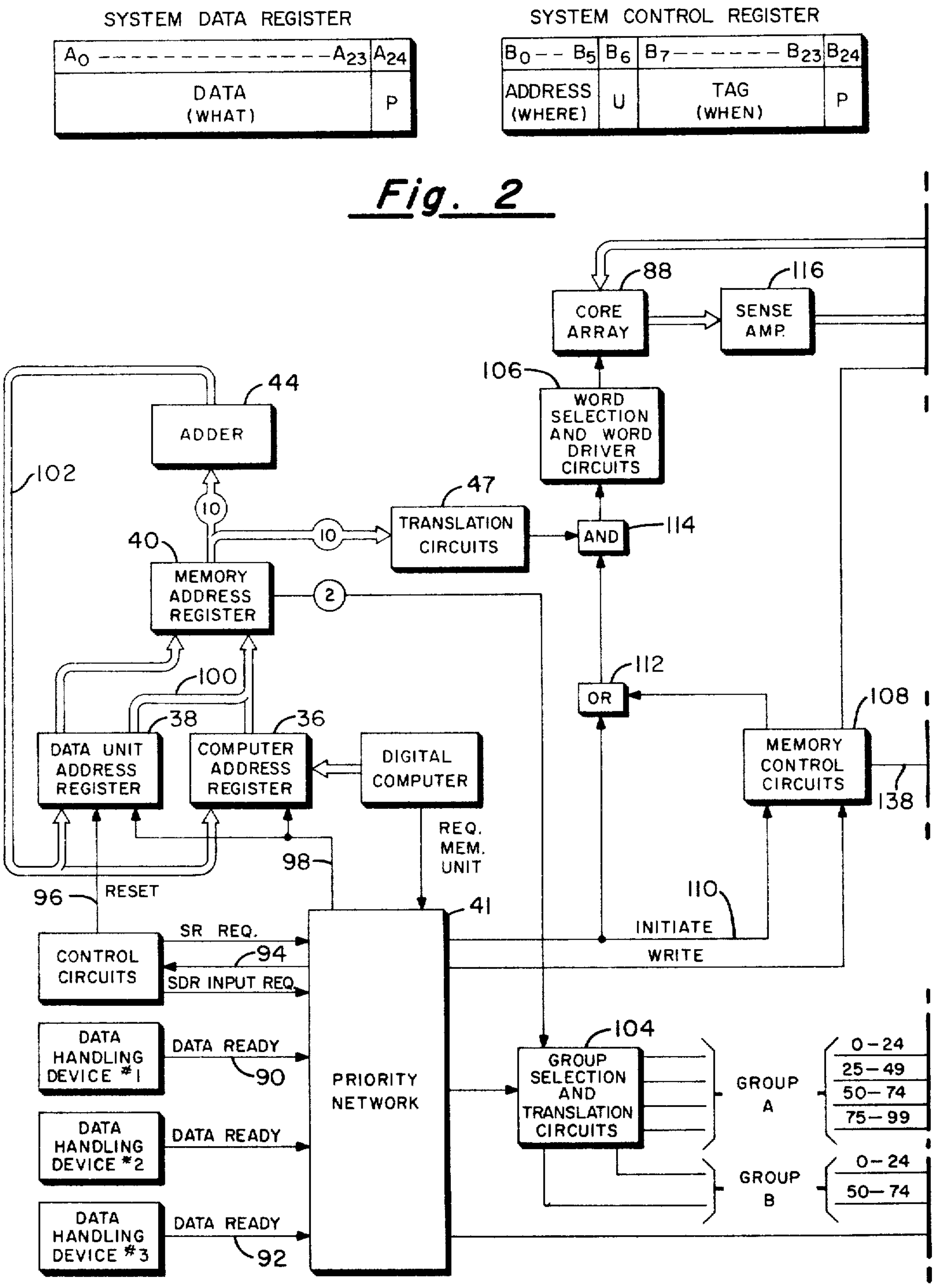

In the drawings:

FIGS. 1*a* and 1*b* taken together is a block diagram representation of the digital controller incorporating the novel aspects of the present invention;

FIG. 2 shows the format of the data and control words, and

Figure 3B:
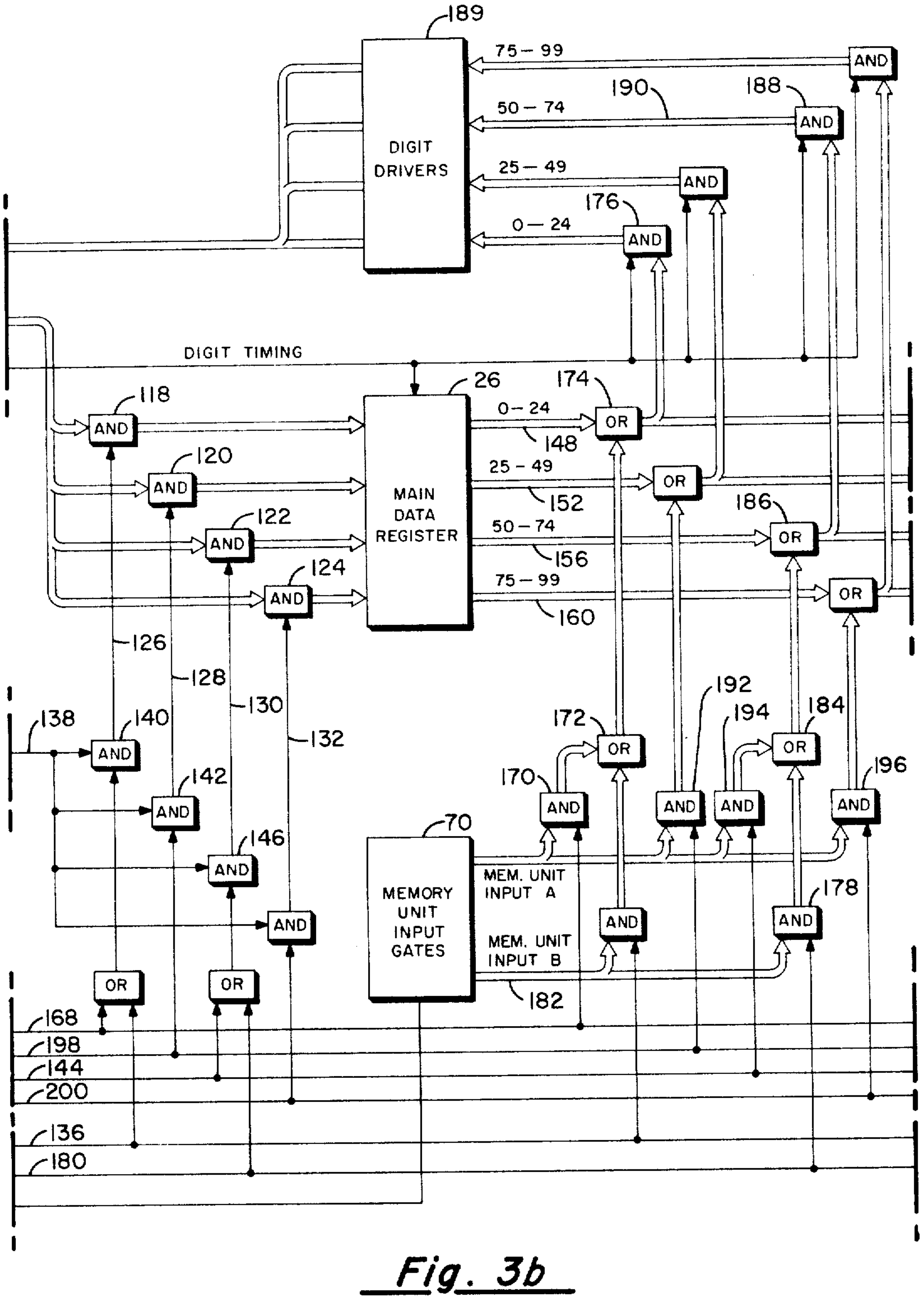
Figure 3C:
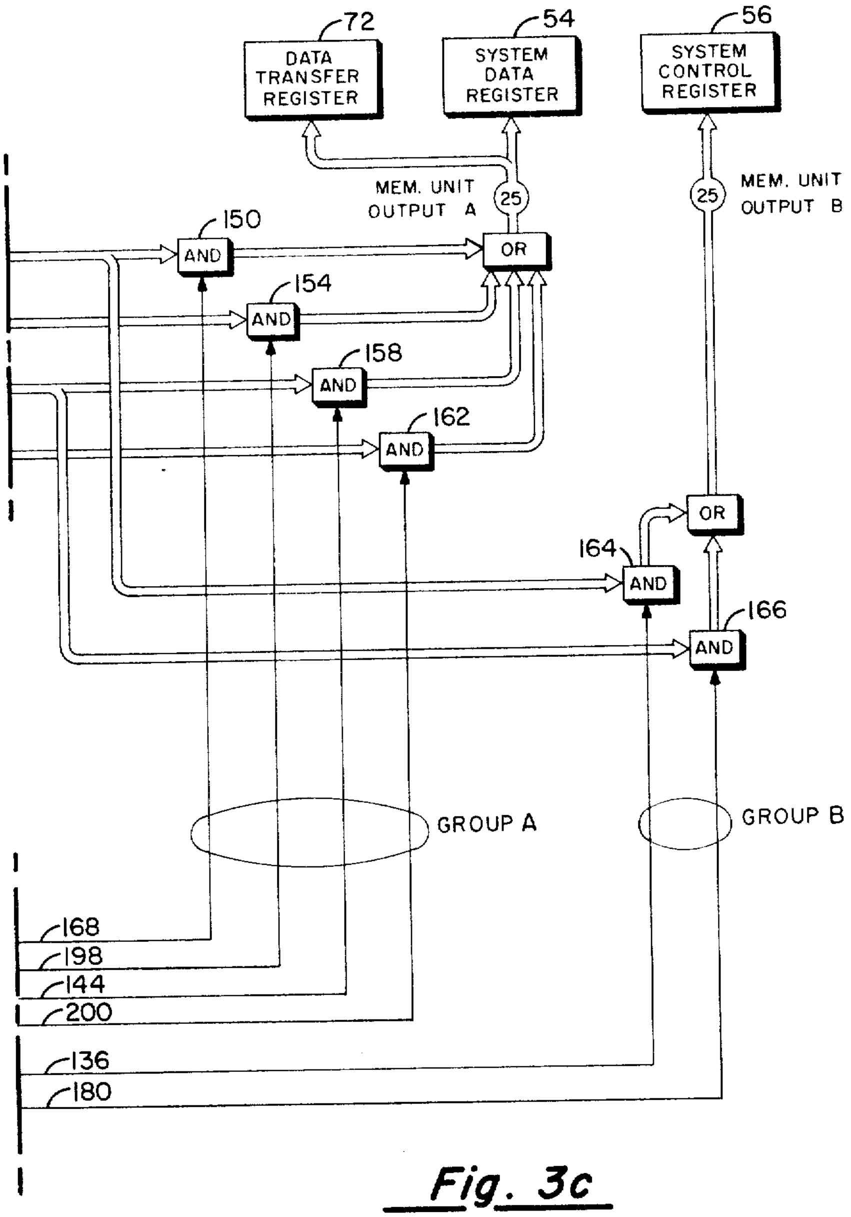

FIGS. 3*a*, 3*b* and 3*c* taken together is a more detailed block diagram of the memory section of the controller of FIG. 1.

Referring first to FIG. 1, there is here indicated a block diagram illustration of a data processing system incorporating the features of the present invention. In this figure, data paths are represented by a cable, whereas control lines are represented by a single line. The arrowhead in all cases, indicates the direction of signal flow, whereas the number associated with a cable indicates the number of data lines contained therein. As is illustrated in FIG. 1, there is included in the overall system a plurality of data handling devices 10, 12 and 14 adapted to receive information signals over the cable 15 and to transmit information signals over the cable 17. As the term is used herein, a data handling device is a device which is adapted to receive binary coded information signals, and in response thereto perform some function such as, for example, printing, storing or controlling the operation of other external devices.

Also included in the complete system is a general-purpose digital computer 16 having an input section 18 and an output section 20. The computer 16 includes a conventional arrangement of a storage or memory section, an arithmetic or processing section, and a control section. The computer performs its assigned functions by executing a series of instructions stored in the computer memory that perform logical operations on binary coded digital data. The control section operates in a conventional manner to interpret the instructions, carry out the commands, furnish the timing and direct the sequence of events for the logical execution of programs. The input section 18 of the computer includes those circuits commonly found in digital computing equipment for accepting words of information from remote devices connected thereto and for exercising the control functions required for storing the received information in the memory section of the computer at a predetermined address. Similarly, the computer output section 20 contains those circuits normally found in data processing apparatus for accepting data signals from the memory section of the computer and for transmitting the signals to data handling devices connected to receive such signals.

The computer to be used with the controller of this invention preferably communicates with devices external thereto under control of Request and Acknowledge signals. A Request signal is defined as a control signal sent from a external device to the computer to inform the computer that this external device has data which it desires to send to the computer or that it desires to receive data from the computer. An Acknowledge signal, on the other hand, is a control signal sent from the computer to an external device to inform the external device either that the input data from it has been accepted by the computer such that the external device may now present another word of input to the computer or that the computer has a word of data on its output cable ready for sampling by the external device.

When one of the devices external to the computer wishes to accept data from the computer, it presents an Output Request signal to the computer. Detecting the presence of this control signal, the computer takes a word of information from its memory and places it on the data lines connecting it to the external device. It then sends an Output Acknowledge signal to the particular data handling device selected, to thereby inform the device that the data on the lines is ready for sampling. The external device to which this Output Acknowledge signal is sent, responds to the signal by taking the data signals from the lines and storing it in its buffer register. By performing its input and output functions under control of the Request and Acknowledge signals, the computer is able to function asynchronously with respect to its external equipment.

The remaining apparatus shown in block diagram form in FIG. 1 i.e., the apparatus exclusive of the computer 20 and the data handling devices 10, 12 and 14, are the circuits and sub-systems comprising the digital controller of the present invention. As an aid in understanding the operation of the controller it is convenient to consider it as being made up of several sections each performing a definite function.

Shown enclosed by the dashed line 22 is the memory section of the controller. Contained within this section are a random access memory, indicated generally by numeral 24, a memory communications register 26 termed the main data register or MDR register, and various gates 28, 30 and 32 for controlling the transmission of data words and control words from and to the random access memory 24. The random access memory not only provides for the storage of data and control words, but also provides intermediate storage for data being transferred from various parts of the entire system to the digital computer 16. In the preferred embodiment of this invention the random access memory is a magnetic core device in which the storage registers are set up on a word-organized basis, and has a capacity for storing 256 one-hundred bit words. The word drivers included in the random access memory 24 may consist of a conventional transformer selection matrix assembly for supplying the current required to drive the 100 cores at a selected one of the 256 word addresses. The sense amplifiers detect the resulting switching of cores in the selected 100-bit word in the core array during the read operation and transmit the information to the main data register 26 by way of the AND gates 28. The digit drivers of the random access memory 24 supply the current necessary to write a word into a selected one of the 256 one-hundred bit storage registers in the core array. It is, of course, possible to have the memory section of the controller physically located in the computer. That is, a certain area in the computer memory can be reserved for the storage of the data necessary for the operation of the controller, with cables connecting the memory of the computer to the controller. In the present specification the memory will be considered as being physically located in the controller and not in the computer.

Contained within the dashed line 34 is the address and priority section which includes those circuits employed to uniquely select one of the memory storage registers for reading or writing. The address and priority section 34 of the digital controller includes a pair of registers 36 and 38. The computer address register 36 is adapted to receive address representing signals from the output circuits 20 of the digital computer via cable 37 and to temporarily store them until they are transmitted to the memory address register 40 upon receipt of a gating signal from the priority network 41 via control line 42. In a similar manner, the data unit address register 38 is provided to temporarily store address representing signals, which may come from the remotely located data handling devices by way of cable 43, until the memory address register 40 is empty and free to accept these address signals.

The memory address register 40 in the preferred embodiment is a ten-bit flip-flop register that operates on a time-shared basis with the registers 36 and 38 to store the address of a current memory reference. After the current reference has been completed, the contents of the register 40 are transmitted by way of the adder 44 and the AND gates 45 to either the register 36 or 38 from which the signals were originally obtained. In passing through the adder, the current address is advanced to the address of the next memory reference before being loaded back into either register 36 or register 38. Again, the transmission of the address signals from the adder to either register 36 or 38 is under control of the priority network 41. More specifically, the gates 45 are enabled by a signal on control line 46 which connects the priority network to the gates.

While the address of the current memory reference is contained in the memory address register 40, the bit permutations thereof are examined by a translator 47 which decodes the contents of the register 40 to provide 16 #X and 16 #Y select signals for the transformer matrix and word driver circuits of the memory 24. The output from the translator is gated to the word driver circuits when the AND gates 48 are enabled by a control signal coming from the priority network 41 by way of control line 51.

The priority network itself contains circuitry which is adapted to receive Request control signals from one or more of the data handling devices and/or from the computer simultaneously and for selecting only one of these units for communication, the selection being on a prearranged basis. A priority structure which might easily be modified to function in the controller of this invention is described in the Ehrman et al. application, Serial No. 143,425, filed October 6, 1961, and assigned to the assignee of the present invention. The output signals from the priority network are used to gate information or address representing signals from the external devices to the controller for effecting the storage or readout of data in or from the random access memory of the controller.

Shown enclosed by the dashed line 52 are the circuits comprising the controller output section. It is the function of this section to time and direct the flow of data from the memory section 22 of the controller to the general purpose computer 16 or to the data handling devices. Included within this section are a system data register 54, a system control register 56, a control register translator 58, a control register comparator 60, a digital converter 62, a strobe signal generator 64 and an output control circuit 66.

The system data register 54 may be a 25-bit flip-flop register used to temporarily store data words read out from the random access memory 24 unitil they are gated to a selected piece of external equipment in the data processing system. When a particular word in the memory is addressed by the address and priority circuits shown enclosed by the dashed line 34, this word is read out by way of AND gates 28 to the main data register 26. From there, the data word passes by way of the OR gates 32 and the cable branch 68 to the system data register.

FIG. 2 illustrates the format of a typical control word and data word obtained in a single memory reference. As will be explained more fully hereinbelow when the details of the memory section of the controller are described in detail, the data word portion of a complete memory word may occupy any one of the four 25-bit groups in the 100-bit memory word, while the control word portion must lie in bit positions 0–24 or 50–74. Of course, if a data word is located in one or the other of these two groups, it cannot also contain a control word. As is indicated in FIG. 2, bit position 24 of thesystem data register contains a parity bit to provide some measure of error detection. As is well known in the digital data processing arts, a parity bit is a bit of predetermined binary significance which is appended to a group of data bits to insure that the number of binary digits of a predetermined value is always odd (or even).

The system control register 56 like the system data register 54 may be a 25-bit flip-flop register which is adapted to be loaded with control words from the random access memory 24. As was mentioned in the introductory portion of this specification, the control word may comprise a first and second group of binary digits, the first of which specifies a destination for the contents of the system data register 54, and the second group of which specifies the conditions which must be satisfied before the data transfer from the system data register will occur. In FIG. 2 the format of a typical control word is shown in detail. An address group of bits occupies bit positions B0–B5 of the system control word and is used to specify where the contents of the system data register are to be sent. Bit position B6 is unused. Contained in bit positions B7 through B23 of a control word is a tag which specifies when the data word is to be transmitted to the data handling device identified by the address contained in bit positions B0–B5. Bit position B24 like bit position A24 stores a parity bit for error detecting purposes.

It can be seen in the preferred embodiment, then, that when the system data register and the system control register are loaded with information from the memory, the system data register contains *what* is to be sent while the system control register contains a *where* and a *when* identifier.

The first group of signals (B0–B5) is adapted to be applied to a binary-to-octal translator 58 when a control word is gated from the memory into the system control register 56. The translator 58 operates to form a 2-digit octal code designating a specific one of a plurality of destinations for the data signals. To accomplish this, the strobe generator 64 receives the 2-digit octal code from the translator 58 and uses this code to generate a strobe pulse for gating the contents of the system data register 54 to only one of the plurality of data handling devices or to the computer.

When a control word is gated into the system control register from the random access memory 24, bits 7 through 23 of the 25-bit control word provide a tag specifying the conditions under which the transfer of data is to be accomplished. The bits comprising this tag are compared on a bit-by-bit basis with the output from the digital converter 62 in comparator 60. When the output from the converter 62 becomes equal to the tag portion of the control word, the comparator produces an output signal for enabling the generation of the strobe signal.

In a typical application for the controller of this invention, the digital converter 62 may comprise a binary counter which is driven by a source of regularly occurring timing pulses. When the counter is advanced by these pulses to a value equal to the valve of the time tag portion of the control word, the comparator 60 produces an enabling signal for the strobe generator 64 such that the contents of the system data register 54 are transmitted in parallel by way of cable 15 to the particular data handling device specified by the output of the translator 58. Thus, it can be seen that the digital controller of this invention is capable of not only routing data words to external devices but also capable of specifying the time at which this data transfer shall occur.

Contained within the dashed lines 68 are the input-output circuits for the controller. Included within this input-output section are the memory unit input gates 70 and the data transfer register 72. Information being sent from the computer 16 to the controller passes by way of the cable 74 to the data transfer register 72 where it is temporarily held until the memory unit is free to accept the information. When the priority network 41 determines that the memory unit is available to accept information from the computer, it produces an enabling signal on the control line 76 which opens the gate 70 thereby allowing the contents of the data transfer register to pass by way of cable 78, the AND gates 30 and the OR gates 32 to the digit drivers of the random access memory 24. The particular location where this information is stored is determined by the contents of the address register 36 operating through the memory address register 40, the translator 47 and the AND gates 48.

In order to transmit information from the memory 24 of the controller to the input circuit 18 of the computer, the memory is interrogated causing a word of information to be transmitted via the gates 28 to the main data register 26. From there the information passes by way of the OR gates 32 and the cable branch 80 to the data transfer register 72. When the computer 16 is in a condition to accept a word of data, this data is transmitted from the register 72 by way of cable 82 to the computer input circuits 18.

In a like manner, information from one of the external data handling devices 10 through 14 may be entered into the random access memory 24 of the controller. A word of information from one of these date handling devices passes by way of cable 17 to the memory unit input gates 70. When the priority network 41 has determined that a particular data handling device is to have access to the memory, an enabling signal is generated on the control line 76 permitting the information on cable 17 to pass through the gate 70 and the cable 78 to the gates 30. An output from the translator 47 on the control line 84 specifies where in the memory these data signals are to be stored.

When transmitting information from the random access memory 24 to the data handling devices, the output control circuit enclosed by dashed line 52 is utilized in the manner already described. It may be noted that the digital converter 62 is arranged to provide an output along cable 86 to the memory unit input gates 70. By providing this data path, the control word tag portion can be appended to the information coming from the computer 16 or from the data handling devices 10 through 14 prior to the storage of the composite control word in the memory 24.

Now that the general description of the various sections of the controller of this invention have been described, consideration will next be given to a more detailed description of the memory section of the controller as well as to the operation thereof.

Referring now to FIG. 3 there is shown in greater detail the address and priority section and the memory section of the controller. When it is desired to read a word of information from the random access memory core array 88 into one of the peripheral data handling devices, the data handling device in question must first present a Request signal to the priority network 41. As was mentioned earlier, a Request signal indicates to the controller that the data handling device producing this signal has data ready and wishes to communicate with the controller. When more than one of the data handling devices and/or the computer is simultaneously presenting Request signals to the controller, it is the function of the priority network to honor these requests on a predetermined priority basis. For example, if it is assumed that data handling device No. 1 and data handling device No. 3 are simultaneously presenting Request signals on the control lines 90 and 92 respectively, the priority network operates to first establish communication between data handling device No. 1 and the controller. After the communication with data handling device No. 1 has been completed, the priority network will then honor data handling device No. 3, provided no other request of a higher priority are received in the meantime.

When a Request signal from one of the data handling devices is honored by priority network 41, a control signal is produced on the output line 94 which is, in turn, connected to certain control circuits of the digital controller. These control circuits respond to the priority network output signal by producing a control signal on the line 96 connected to the data unit address register 38. This signal on the line 96 serves to reset register 38 to a predetermined starting address which specifies the location in the core array 88 where the first word of a message has been previously stored. Next, the priority network 41 produces an enabling signal on control line 98 which serves to gate this starting address by way of cable 100 to the memory address register 40. Once the address is loaded into register 40, it is available to the adder 44 which operates to increment the starting address to form the address of the next word of data of the message to be transferred. This incremented address is applied by way of cable 102 to the input of the data unit address register 38 where it remains until the next data transfer cycle. The address contained in the register 40, however, is still the starting address.

The core array 88 is a conventional arrangement of magnetic storage elements set up on a word-organized basis. In the preferred embodiment of the invention the array contains 256 100-bit words. Data transfers from and to the core array are in either 25- or 50-bit groups and therefore the address assignments are based on a 25-bit group. By assigning a discrete address to each of the four 25-bit groups, the memory size is effectively changed to 1024 25-bit words.

To bit permutations of the contents of register 40 are examined by the translator 47 and the group selection and translation circuits 104. The translation circuit 47 decodes the bit pattern contained in the memory address register 40 to provide sixteen #X and sixteen #Y selection signals for the word selection and driver circuits 106. As was mentioned earlier, the word selection and driver circuit consists of a transformer matrix assembly and digit drivers for selecting an address in the core array 88. The X and Y address from the translator circuit 47 is gated into the word selection transformer by the memory control circuit 108 or by an initiate control signal produced by the priority network 41. This initiate signal is applied by way of control line 110 and the OR circuit 112 to a first input terminal of an AND circuit 114. In other words, the initiate signal enables the AND circuit 114 and allows the decoded address to be applied to the word selection driver circuit 106. The word driver circuits then supply the current necessary to drive the 100 cores of the word at the selected address.

The group selection and translation circuits receive 2-bits of the contents of the memory address register 40 by way of cable 116 and depending upon the permutation of these 2-bits, produce group A or group B enable signals. As will be described more fully hereinbelow, the group A enable signals permit the transfer of any 25-bit segment of the selected 100-bit data word to the main data register 26. The group B enables are used in conjunction with group A enables for transferring a 50-bit word from the core array 88 to the main data register 26.

The digital controller of this invention employs two groups of data input and output lines, each group consisting of 25 lines. The A group lines can be used to transfer data to or from any of the 25-bit groups in a 100-bit core array register. The B group input or output lines, however, can transfer a control word to and from only bits 0 through 24 or bits 50 through 74. The B group lines may be used in conjunction with the appropriate A group for transferring a 50-bit segment, i.e., bits 0 through 49 or bits 50 through 99. Hence, upon a single memory reference it is possible to access both a control word and a data word for subsequent transmission to the system control and system data registers.

The output signals resulting from the switching of the memory cores comprising the selected 100-bit word are amplified by the sense amplifiers 116 and applied to a first input of a set of AND gates 118, 120, 122 and 124. The particular gate of gates of this set to be enabled to thereby permit the continued transmission of these signals, depends upon the signals applied to the gates on the lines 126 through 132. For example, if the 2 group selecting bits of the memory address register 40 are such that the group selection circuits 104 develop a group A enable on line 198 and a group B enable on line 136, the strobe signal from the memory control circuit 108 appearing on conductor 138 will pass through the AND circuits 140 and 142 to, in turn, enable the gates 118 and 120. As a result, a 50-bit segment, i.e., bits 0 through 24 and 25 through 49 are entered into the main data register 26. If, on the other hand, the permutation of the 2-bits in the memory address register 40 were of a different value, so as to produce a group A enable signal on the control line 144 only, AND circuit 146 would have been enabled to thereby allow the strobe signal from the memory control circuits to pass through the AND circuits 146 and to serve as a gating signal for the AND circuit 122. Under this last mentioned set of circumstances, only 25-bits, i.e., bits 50 through 74 of the selected 100-bit word would have been entered into the main data address register 26.

Once the selected data bits are stored in the main data register 26 this information is available to certain other registers in the system. More specifically, the data stored in bit positions 0 through 24 of the main data register are applied by way of data bus 148 to the AND circuits 150. The information stored in bit positions 25 through 49 are applied by way of the data bus 152 to the AND gates 154. The information contained in bit positions 50 through 74 of the main data register are applied by way of data bus 156 to the AND gates 158 while the information in bits positions 75–99 of the main data register are applied by way of the bus 160 to the AND gates 162. It can be seen that the signals for enabling the gates 150, 154, 158 and 162 are the group A enables produced by the group selection and translation circuits 104. The group A enables therefore control the transfer of data from the main data register to the system data register 54 and to the data transfer register 72. The group B enables are applied to the AND gates 164 and 166 along with data signals from stages 0 through 24 and stages 50 through 74, respectively, of the main data register 26. Depending upon which of the group B enable lines is energized one or the other of the gates 164 or 166 will be enabled to permit the transfer of 25-bits of information to the system control register 56. It may be recalled that the information placed in the system control register is a control word and specifies the destination and the condition under which the contents of the system data register 54 will be transmitted. A group B enable is always accompanied by a group A enable if information is to be transferred from the memory to the system registers. However, when it is desired to load the data transfer register 72, only a group A enable is applied. As a result only a 25-bit word will be loaded into the data transfer register.

As was explained in connection with FIG. 1, once the information is contained in the system registers (which includes the system data register 54 and the system control register 56), is will be transmitted to the peripheral equipment specified by selected bits of the system control register at the time that the output of the digital converter is identical to the remaining bits of the system control register.

When it is desired to transfer information from the digital computer or from any one of the data handling devices to the memory of the controller, the data signals are first applied to the memory unit input gates 70. At the same time, the output from the digital converter 62 (FIG. 1) is also applied to these gates. The address where this information is to be stored is determined by the address contained in the computer address register 36. In the same manner as was previously described, the contents of the register 36 are gated to the memory address register 40 by an enabling signal from the priority network 41. Once the address representing signals from the computer are contained in the memory address register 40, the group selection bits thereof are examined by the group selection and translation circuits 104 to produce both group A and group B enable signals. A group A enable signal on the enable bus 168 enables the gate 170 to thereby allow the 25-bits of data from the memory unit input gates to pass through the OR circuits 172 and 174 to the inputs of another AND gate 176. This last mentioned gate is enabled by a control signal generated by the memory control circuit 108 thereby allowing the data signals to pass through the gate and to energize the digit driver 189 for bit positions 0–24. As a result, these 25-bits of information are written into the core array 88 at the word location specified by the contents of the memory address register 40. The manner in which reading and writing of information out of and into a magnetic core memory is quite well known in the art and it is therefore felt to be unnecessary to describe the exact circuits employed to drive the core array.

In order to transfer the tag portion of a control word into predetermined bits of a control word in the memory, the AND circuit 178 must be enabled by a group B enable appearing on the bus 180. When this last mentioned gate is enabled, the 25-bits applied to the memory unit input gates on input B cable 182 pass through the gate 178 and through OR circuits 184 and 186 to the AND gates 188. When the gates 188 are "opened" by the timing signals from the memory control circuit 108, the tag portion of the control word passes through the gate and along the bus 190 to energize the digit drivers for bit positions 50–74 of the selected memory word. As a result, the control tag is stored in the memory at a predetermined addressable location.

The gates 192, 194, and 196 when enabled by group A enables on the enable busses 198, 144, and 200, serve to transfer 25-bits of the data from the memory unit input gates 70 to stages 25–49, 50–74, and 75–99 of the selected memory locations in the core array.

It can be seen, then, that the "A" group lines can be used to transfer data to or from any of the 25-bit groups in a memory word. The "B" group lines can transfer data to or from bits 0–24 or bits 50–74 of the selected memory word. The "B" group lines are always used in conjunction with the appropriate "A" group lines for transferring bits 0–49 or bits 50–99.

When operating in a real-time system such as a traffic control system, a plurality of data handling devices are arranged to supply information to a digital computer by way of the digital controller. The data handling devices in a traffic control system may comprise strategically located traffic rate monitoring devices capable of measuring the number of vehicles passing these sensing stations during a predetermined time interval. Circuitry is provided in the data handling devices for presenting a request signal to the priority network 41 (FIG. 1) to indicate to the controller that the device presenting the request signal has data which it desires to transmit to the controller. The priority network 41 responds to the request signals and provides a gating pulse which, when applied to the data unit address register 38, is effective to allow an address unique to the particular data handling device having top priority to be transmitted to the data unit address register 38. In a manner which was previously described, the address temporarily stored in the data unit address register 38 is transferred to the memory address register 40 so the bits of this address may be examined by the translator 47 and the group selection and translation circuits 104 (FIG. 3).

At the same time that the address selection is occurring, the priority network 41 presents a control signal to the memory unit input gate 70 by way of a control line 76 for gating the data signals from the selected one of the data handling devices through the cable 78, the AND gates 30 and the OR gates 32 to the digit driver circuits. At the same time, a time tag from the digital converter 62 passes by way of the cable 86, the memory unit input gate 70, the cable 78, the AND gates 30 and the OR gates 32 to other digit drivers. As a result, the data from the peripheral equipment along with an identifier tag for this data is stored in the core array at an address specified by the output of the translator 47.

Information stored in the random access memory 24 of the controller may be readout therefrom and transmitted to either the digital computer 16 or to a selected one of the data handling devices. In reading out a word of data from the memory to the computer, the computer presents a Request signal to the priority network 41. The priority network will produce a gating signal for transferring an address from the output section 20 of the computer to the computer address register 36 in the controller provided the above mentioned Request signal is of highest priority at the time in question. This address is transferred in the manner previously described to the memory address register 40 and from there to the translator 47 where the address is decoded to select the appropriate word driver for switching the core in the random access memory array at the selected word location. The sense amplifiers amplify and shape the signals produced by the switching of the cores and these data signals are applied to one input of a set of AND gates 28. The output of the group selection and translation circuits 104 controls the opening of the gates 28 to allow the data to be read into the main data register 26. From here the information read out from the memory passes through the OR gates 32 and the cable branch 80 and is written into the data transfer register 72. Once contained in the data transfer register the data is available to the input circuits 18 of the computer by way of the data cable 82.

The results of the computation which takes place in the digital computer may be transferred from the computer output circuits 20 by way of the cable 74 back to the data register 72. Upon receiving a control signal from the priority network 41 the information from the computer may pass by way of the cable 75 to the memory unit input gate 70. When these gates are enabled by a control pulse from the priority network applied by way of conductor 76, the data from the computer may pass by way of cable 78, the AND gates 30 and the OR gates 32 to the digit drivers of the random access memory. Hence, it can be seen that the controller of this invention is capable of routing data from one or more of a plurality of data handling devices to a computer and conversely, from the computer to the memory section of the controller where it becomes available to the data handling devices upon request.

Assuming that traffic data has been sent from the data handling devices through the controller to the computer and that the computer has made a calculation and transmitted to results of this calculation to the random access memory 24 of the controller, a description will now be presented as to how this data may be transmitted back to a data handling device or suitable control apparatus for effecting control over the traffic flow.

The information contained in the memory 24 of the controller is readout by the address and priority circuits enclosed by the dashed line 34 in the manner already described. It is read out to the main data register 26. Once stored in the main data register the 50-bits of data pass through the OR gates 32 with 25-bits going to the system data register and 25-bits going to the system control register 56. As has already been described it is the group selection and translation circuits 104 (FIG. 3) which determines which bits of the 100-bit memory word are placed in the system data register 54 and the system control register 56.

Once a control word is loaded in the system control register, bits 0–5 thereof are examined by the translator 58. It may be recalled the bits 0–5 specify where the data contained in the system data register 54 is to be transmitted. Bits 7–23 of the system control register are applied along with the output of the digital converter 62 to the input of a comparator 60. In the traffic control problem being described, the digital converter may take the form of a counter which receives advance pulses from a source of regularly occurring clock signals, such as an oscillator. Once the count contained in the counter has advanced so as to contain a quantity equal on a bit-by-bit basis to the contents of stages 7–23 of the system control register, the comparator produces an output signal to the control circuit 66 which responds to this signal by developing a gating pulse, which is returned to the translator 58 to allow the two digit octal code to be sent to the system strobe generator 64. It is the strobe generator 64 which actually produces the signal in response to the output from the translator that goes to the data handling device specified by the code to allow the data contained in the system data register to be accepted by the selected data handling device. By controlling the time at which the data from the computer is transmitted to the data handling devices it is possible to exert precise control over the traffic.

While there have been shown and described and pointed out the fundamental novel features of the invention as applied to the preferred embodiment, it will be understood that various omissions, substitutions and changes in the form and detail of the device illustrated and in its operation may be made by those skilled in the art without departing from the spirit of the invention. It is the intention, therefore, to be limited only as indicated by the scope of the following claims.

What is claimed is:

1. A controller for use with a digital data processing machine for directing the flow of information between said digital data processing machine and a plurality of devices to be controlled, comprising:

memory means for storing data words and control words, said control words being comprised of at least first and second groups of binary digits;

control register means coupled to said memory means adapted for receiving control words read out from said memory means;

a data register coupled to said memory means and adapted for receiving data words read out from said memory;

translating means coupled to said control register for receiving said first group of binary digits of said control words for selecting only one out of said plurality of devices to be controlled;

a digital converter device including means for receiving input signals indicative of transmission control criteria for converting said input criteria quantity to a digital representation thereof;

comparator means coupled to said converter and said said control register for receiving the output signals from said converter and said second group of binary digits of said control word for producing a gating signal when the digits representing said input criteria in said converter has a predetermined relationship to said second group of binary digits; and means in said data register responsive to said gating signal for transmitting a data word to the device to be controlled selected by said translating means.

2. A controller for use with a digital data processing machine for directing the flow of information between said digital data processing machine and a plurality of devices to be controlled, comprising:

memory means in said controller for storing data words and control words, said control words being comprised of at least a first group of binary digits indicative of a preselected one of the peripheral units and a second group of binary digits indicative of a predetermined control criterion;

a control register coupled in a data receiving mode to said memory means and adapted for receiving control words read out from said memory means;

a data register coupled in a data receiving mode to said memory means and adapted for receiving data words read out from said memory;

means coupled to said control register for receiving said first group of binary digits of said control words for selecting the one of said plurality of devices to be controlled specified by said first group of binary digits;

a counter including input means for receiving advance signals from a source of regularly occurring timing signals;

comparator means coupled to said counter and said control register for receiving the output signals from said counter and said second group of binary digits of said control word from said control register for producing a gating signal when the digits representing the count in said counter equal said second group of binary digits; and means in said data register responsive to said gating signal for transmitting a data word to the device to be controlled selected by said translating means.

3. A controller for use with a digital data processing machine for directing the flow of information between said digital data processing machine and a plurality of devices to be controlled, comprising:

random access memory means for storing data words and control words in addressable storage locations therein, said control words being comprised of at least first and second groups of binary digits, said first group of digits representing the location where data words are to be transmitted and said second group of digits representing the time when said data words are to be transmitted;

a control register connected to said memory means and adapted for receiving control words read out from said memory means;

a data register connected to said memory means and adapted for receiving data words read out from said memory;

translating means coupled to said control register for receiving said first group of binary digits of said control words for selecting only one of said plurality of devices to be controlled;

a source of regularly occurring timing pulses;

a counter coupled to said source of regularly occurring timing signals for maintaining a time count having a predetermined incremental accuracy;

comparator means coupled to said counter and said control register for receiving the output signals from said counter and said second group of binary digits of said control word for producing a gating signal when the digits representing the count in said counter equal said second group of binary digits; and means in said data register responsive to said gating signal for transmitting a data word to the device to be controlled selected by said translating means.

4. In a digital data processing system, the combination comprising:

a digital computer of the type having storage means for storing programs of instructions, data words and control words and an output register adapted to receive data and control words from said storage means during the execution of said programs; a plurality of data handling devices; and a controller for directing the flow of information between the output register of said computer and said plurality of data handling devices, said controller including random access memory means for storing at addressable storage locations therein data words and control words, said control words being comprised of at least first and second groups of binary digits, said first group of digits indicating which of said plurality of data handling devices is to receive data words and said second group of digits representing when said data words are to be transmitted to the selected data handling device, an address selection circuit connected to said memory means, a data transfer register connected between the output register of said computer and the memory of said controller, means for transmitting address representing signals from said computer to said address selection circuit, means responsive to the presence of address representing signals in said data word contained in said data transfer register to be stored in said memory at the location specified by said address representing signals, a control register connected to said memory means adapted to receive control words read out from said memory, a data register connected to receive data words read out from said memory, means connected to said control register for receiving said first group of binary digits for selecting only one of said plurality of devices to be controlled, a digital converter adapted to receive an input quantity for producing a binary coded signal representation of said quantity, comparison means connected to receive said second group of binary signals and the output of said converter for producing a gating signal when the converter output equals said second group of binary digits, and means in said data register responsive to said gating signal for transmitting a data word to the selected one of said data handling devices.

5. Apparatus as in claim 4 wherein said controller further includes an input register connected to said address selection circuit, means for transmitting address representing signals from said data handling devices to said input register such that data words and control words selected by address representing signals from said data handling devices are read out from the controller memory means to said control register and data register.

6. Apparatus as in claim 4 wherein said computer further includes an input register for temporarily storing data and control words until they can be read into the computer storage means under the control of a program; and means responsive to said gating signal for transmitting a data word from said memory means in the contoller to the input register of said computer.

7. In a digital data processing system, the combination comprising: a digital computer of the type having storage means for storing programs of instructions, data words and control words, said control words being comprised of at least first and second groups of binary digits, said first group of digits indicating which of a plurality of data handling devices is to receive data words and said second group of digits representing when said data words are to be transmitted to the selected data handling device, an input register for storing data words and control words until they can be read into said storage means and an output register adapted to receive data and control words from said storage means; a plurality of data handling devices; and a controller for directing the flow of information between the output register of said computer and said plurality of data handling devices and between said data handling devices and the input register of the computer including random access memory means for storing at addressable storage locations therein data words and control words, an address selection circuit including an address register and a translator connected to said memory means, a data transfer register connected between the output register of said computer and the memory of said controller, means for transmitting address representing signals from said computer to said address register such that data words contained in said data transfer register are stored in said memory at the location specified by said address representing signals, a control register connected to said memory means and adapted to receive control words read out from said memory means, a data register connected to receive data words read out from said memory means connected to said control register for receiving said first group of binary digits for selecting only one of said plurality of data handling devices to be controlled or the input register of the computer for a subsequent receipt of a data word, a source of regularly occurring timing pulses, a counter connected to receive and count said timing pulses, comparison means connected to receive said second group of binary signals and the output of said counter for producing a gating signal when the counter output equals said second group of binary digits, and means in said data register responsive to said gating signal for transmitting a data word to the input register of the computer or to the selected one of said data handling devices to be controlled.

8. A controller for use with a digital data processing machine for directing flow of information between a digital data processor and a selected one of a plurality of peripheral devices to be controlled, said controller including: a main data register for receiving signals alternatively indicative of control words and data words, said control words being comprised of at least first and second groups of binary digits, said first group of digits representing the location where data words are to be transmitted and said second group of digits representing the time when said data words are to be transmitted; a system data register coupled to said main data register for receiving and at least temporarily storing said data words; a control register coupled to said main data register for receiving and at least temporarily storing said control words; translating means coupled to said control register for receiving said first group of binary digits of said control word for selecting only one of the plurality of peripheral devices; a counter including input means for receiving advance signals from a source of regularly occurring timing signals; comparator means coupled to said counter and said control register for receiving the output signals from said counter and said second group of said binary digits of said control word for producing a gating signal when the digits representing the count in said counter equals said second group of binary digits; and means in combination with said data register for transmitting a data word to the device selected by said translating means when activated by said gating signal.

9. A controller as in claim 1 wherein said digital converter comprises a counter advanced by a source of clock pulses.

References Cited by the Examiner

UNITED STATES PATENTS

| | | | |
|---|---|---|---|
| 3,061,192 | 10/1962 | Terzian | 340—172.5 X |
| 3,200,380 | 8/1965 | MacDonald et al. | 340—172.5 |

ROBERT C. BAILEY, *Primary Examiner.*

P. J. HENON, *Assistant Examiner.*